(12) United States Patent
Govindan Nair et al.

(10) Patent No.: US 10,397,092 B2
(45) Date of Patent: Aug. 27, 2019

(54) REDUCING FLOODING OF ROUTE UPDATES OF A DYNAMIC ROUTING PROTOCOL

(71) Applicant: Hewlett Packard Enterprise Development LP, Houston, TX (US)

(72) Inventors: Anoop Govindan Nair, Bangalore (IN); Anil Raj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/567,043

(22) PCT Filed: Jun. 24, 2015

(86) PCT No.: PCT/US2015/037430
§ 371 (c)(1),
(2) Date: Oct. 16, 2017

(87) PCT Pub. No.: WO2016/175874
PCT Pub. Date: Nov. 3, 2016

(65) Prior Publication Data
US 2018/0097718 A1 Apr. 5, 2018

(30) Foreign Application Priority Data
Apr. 30, 2015 (IN) ............................ 2242/CHE/2015

(51) Int. Cl.
*H04L 12/757* (2013.01)
*H04L 12/715* (2013.01)
(Continued)

(52) U.S. Cl.
CPC .......... *H04L 45/023* (2013.01); *H04L 45/025* (2013.01); *H04L 45/028* (2013.01); *H04L 45/04* (2013.01)

(58) Field of Classification Search
CPC ... H04L 45/023; H04L 45/025; H04L 45/028; H04L 45/04
See application file for complete search history.

(56) References Cited

U.S. PATENT DOCUMENTS 6,757,258 B1    6/2004  Pillay-Esnault
7,623,474 B2 *  11/2009  Tran .................... H04L 12/1836
                                                       370/255
(Continued)

OTHER PUBLICATIONS

International Searching Authority, The International Search Report and the Written Opinion, dated Feb. 18, 2016, PCT/US2015/037430, 9 Pgs.

(Continued)

*Primary Examiner* — Yemane Mesfin
*Assistant Examiner* — Intekhaab A Siddiquee (57) ABSTRACT

Examples disclosed herein relate to reducing flooding of route updates of a dynamic routing protocol. In an example, number of route updates received by a router from each neighbor router may be determined, wherein the router may be present in a network using a dynamic routing protocol. Each neighbor router may be classified into one of a plurality of groups of neighbor routers in such a manner that number of route updates originating from each group of neighbor routers is approximately same. A first route update interval may be determined for each group of neighbor routers for sending a respective first set of future route updates therefrom to the router. The respective first route update interval for sending the respective first set of future route updates may be notified to the respective member routers of each group of neighbor routers.

15 Claims, 4 Drawing Sheets

(51) Int. Cl.
*H04L 12/751* (2013.01)
*H04L 12/759* (2013.01)

(56) References Cited

U.S. PATENT DOCUMENTS

| | | |
|---|---|---|
| 8,498,299 B2 | 7/2013 | Katz |
| 2005/0220013 A1 | 10/2005 | Singh et al. |
| 2008/0310377 A1 | 12/2008 | Fammer et al. |
| 2010/0128638 A1 | 5/2010 | Navas et al. |
| 2012/0287935 A1 | 11/2012 | Swallow et al. |
| 2013/0265881 A1 | 10/2013 | Filsfils et al. |
| 2014/0173133 A1 | 6/2014 | Wagh |
| 2014/0181320 A1 | 6/2014 | Farkas |
| 2014/0369233 A1 | 12/2014 | Lin |
| 2016/0020967 A1* | 1/2016 | Thubert ............ H04L 43/06 370/252 |

OTHER PUBLICATIONS

Wagh, S. et al, "GDRP: A Novel Approach for Power Optimization in Wired Core Networks", Aug.-Sep. 2014, 6 Pgs.

* cited by examiner

REDUCING FLOODING OF ROUTE UPDATES OF A DYNAMIC ROUTING PROTOCOL

BACKGROUND

Routing protocols have evolved over the years to match the growing complexity of computer networks. Routing protocols specify how routers in a computer network communicate and share information with each other. Routing protocols allow routers to dynamically learn about routes that may exist on a network, build routing tables and perform routing decisions. Some examples of routing protocols include Interior Gateway Routing Protocol (IGRP), Enhanced Interior Gateway Routing Protocol (EIGRP), Open Shortest Path First (OSPF), Border Gateway Protocol (BGP), and integrated Intermediate System-Intermediate System (ISIS).

BRIEF DESCRIPTION OF THE DRAWINGS

For a better understanding of the solution, embodiments will now be described, purely by way of example, with reference to the accompanying drawings, in which.

DETAILED DESCRIPTION

Routing may be classified into two main types: static routing and dynamic routing. In static routing, it is typically a system administrator who manually enters the routes in a router's table. In dynamic routing, a router's routing table is build automatically using routing protocols such as Enhanced Interior Gateway Routing Protocol (EIGRP), Open Shortest Path First (OSPF), and Border Gateway Protocol (BGP).

Dynamic routing protocols enables routers to dynamically discover and maintain routes in routing tables, exchange routing updates with other routers, identify the best path to a destination network, and share a same network topology map with other routers in a network. According to one classification, dynamic routing protocols may be classified into two types: Interior Gateway Protocol (IGP) or Exterior Gateway Protocol (EGP). Interior Gateway Protocols (IGP): IGP is used for routing within an autonomous system (AS). An autonomous system (AS) may be defined as a collection of routers under a common administration, for example a company or an organization. Examples of an IGP may include EIGRP, OSPF, and IS-IS. Exterior Gateway Protocol (EGP) is used for routing between autonomous systems. An example of EGP includes the Border Gateway Protocol (BGP). According to one classification, Interior Gateway Protocol (IGP) may be classified into two types: distance vector protocol and link state protocol. Examples of link state routing protocols include Open Shortest Path First (OSPF) and Intermediate System to Intermediate System (IS-IS).

In dynamic routing protocol each router in a network constructs a topology map of the network by collecting information from all the other routers. Each router learns about its own directly connected networks. A dynamic routing protocol uses hello packets to discover and maintain neighboring routers. The hello packets may contain information such as router ID, router timers, etc. If the routers agree on the information they become neighbors. Each router builds its own route update information and shares it with each other router. Route update information may include information about the state of a link(s) generated by a dynamic routing protocol. For example, in OSPF, route update information may be in form of Link State Advertisements (LSAs). Route update information may include, for example, information about neighbors such as neighbor ID, link type, and bandwidth. It may also include information about an interface such as IP address, subnet mask, type of network, and neighboring routers on the link. The route update information may be maintained in a route update database on each router. Each router floods its route update information to all neighbor routers. The neighbor routers store the information and forward it until all routers have the same information. Once all the routers have received the route update information, the routers generate a topological map of the network which is used to determine the best routes to a destination router or node in the network. The collection of best paths is stored in a routers routing table.

Generally, routers share their route update information with other routers at periodic intervals. The refreshing of route update information is performed irrespective of whether there's a change in the information or not. For example, in case of OSPF, the Link State Advertisements (LSA) is refreshed typically after every thirty minutes. In an instance, route update information may be distributed via flooding of route update packets after the designated time interval. In other words, the routing updates may be sent through periodic route update packets. The routing protocol may flood the network with route updates to all neighbor routers. Each router creates route updates and floods it to its neighbors. Needless to say this is not a desirable situation since a router may be connected to a number of different neighbors in a network, and with identical advertising intervals in all neighbors, events like switch reboot or routing protocol enable may cause all neighbors to send the routing information to the router at overlapping intervals which can cause a packet storm at the receiving router. This may lead to packet drops and high CPU utilization the receiving router, which may result in further aggregation of packets due to retries. In an instance, a packet storm may consume router resources to an extent that it may render the router unable to transport normal traffic. Consequently, a large number of packets may be discarded or may not be processed in time. In such scenarios, a router may encounter memory depletion and neighbor state rollback phenomenon or adjacency losses. This may in turn lead to deletion of routes thereby affecting network access.

To address such issues, the present disclosure describes various examples for reducing flooding of route updates of a dynamic routing protocol. In an example, number of route updates received by a router from each neighbor router may be determined, wherein the router may be present in a network using a dynamic routing protocol. Each neighbor router may be classified into one of a plurality of groups of neighbor routers in such a manner that number of route updates originating from each group of neighbor routers is approximately same. A first route update interval may be determined for each group of neighbor routers for sending a respective first set of future route updates therefrom to the router. A respective first route update interval for sending the respective first set of future route updates may be notified to the respective member routers of each group of neighbor routers. The proposed solution thus reduces flooding of route updates caused due to overlapping update intervals at the neighboring routers.

Figure 1:
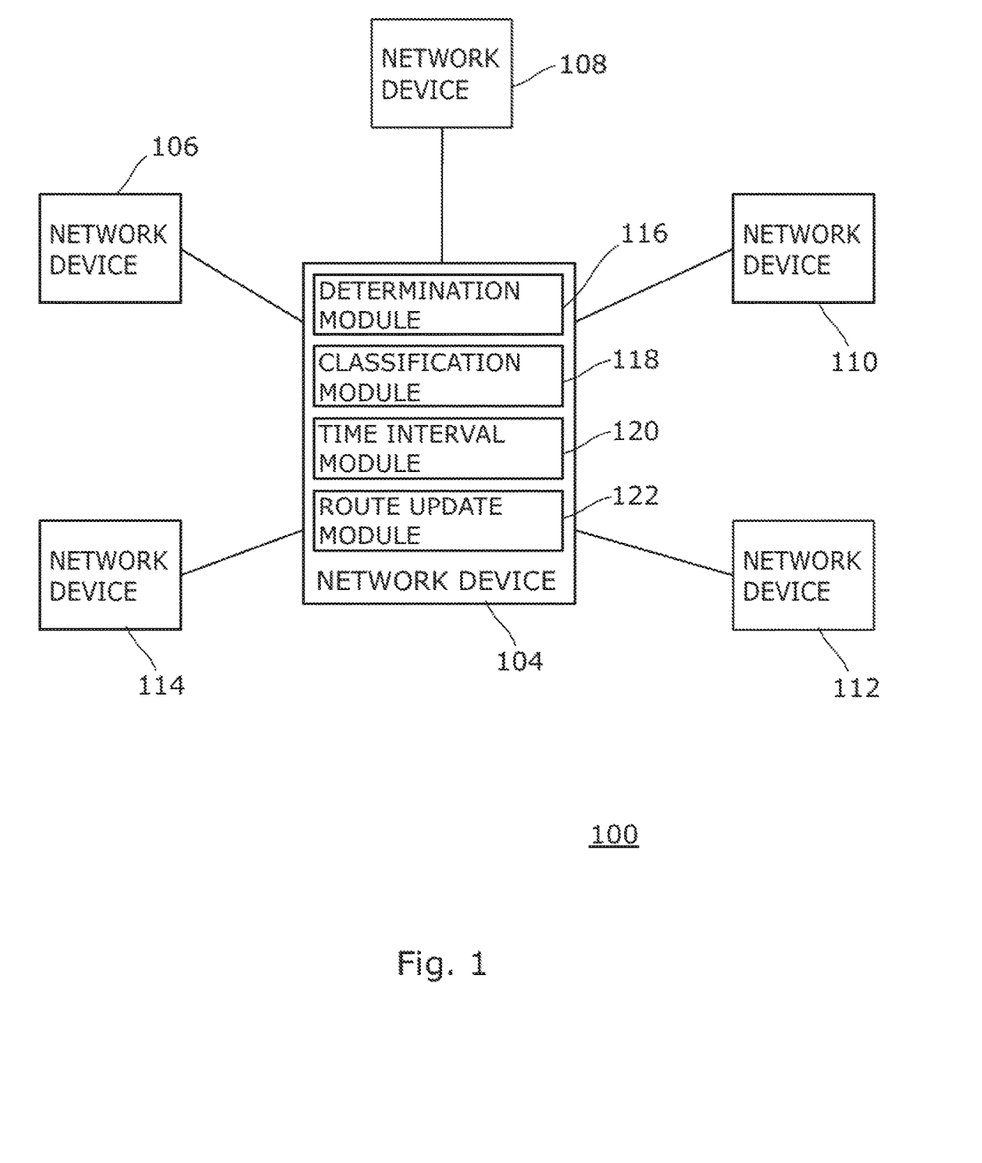
FIG. 1 is a block diagram of an example network system for reducing flooding of route updates of a dynamic routing protocol.

FIG. 1 is a diagram of an example network system 100 for reducing flooding of route updates of a dynamic routing protocol. Network system 200 may include a plurality of network devices 104, 106, 108, 110, 112, and 114. Although only five network devices are shown in FIG. 1, other examples of this disclosure may include more or less number of network devices.

Network devices 104, 106, 108, 110, 112, and 114 may be communicatively coupled via a computer network. Computer network may be a wireless or wired network. Computer network may include, for example, a Local Area Network (LAN), a Wireless Local Area Network (WAN), a Metropolitan Area Network (MAN), a Storage Area Network (SAN), a Campus Area Network (CAN), or the like. Further, computer network may be a public network (for example, the Internet) or a private network (for example, an intranet). In an example, computer network may be an IP network. In another example, computer network may be an autonomous system. An "autonomous system" (AS) may be defined as a collection of routers whose prefixes and routing policies are under a common administrative control.

Network devices 104, 106, 108, 110, 112, and 114 may each be, for example, a network switch, a network router, a virtual switch, and a virtual router. In an example, network devices 104, 106, 108, 110, 112, and 114 may each administer a dynamic routing protocol (for example, OSPF). Each network device 104, 106, 108, 110, 112, and 114 may establish neighbor relationship with other network devices in the same area or different areas of network. Each network device 104, 106, 108, 110, 112, and 114 may receive route update information from its neighbors. In an example, route update information may be received through a flooding process. For instance, network device 104 may receive route update information from its neighbor network devices 106, 108, 110, 112, and 114. Likewise, network device 106 may receive route update information from its neighbor network devices 104, 108, 110, 112, and 114. Other network devices may share their route update information in the same manner. Each network device 104, 106, 108, 110, 112, and 114 may maintain a route table, for example, for storing its own route information and route update information obtained from its neighbors.

Each network device 104, 106, 108, 110, 112, and 114 may construct a topology map of the network by collecting information from all the other network devices. In an example, hello packets may be used to discover and maintain neighbor network devices. The hello packets may contain information such as network device ID, device timers, etc. If the net ark devices agree on the on they become neighbors. Each network device 104, 106, 108, 110, 112, and 114 may build its own route update information and share it with other network devices. Route update information may include information about the state of a link(s) generated by a dynamic routing protocol. For example, in OSPF, route update information may be in form of Link State Advertisements (LSAs). Route update information may include, for example, information about neighbors such as neighbor ID, link type, and bandwidth. It may also include information about an interface such as IP address, subnet mask, type of network, and neighboring routers on the link. Each network device may flood its route update information to all neighbor routers. The neighbor network devices may store the information and forward it until all network devices have the same information. Once all the network devices have received the route update information, the network devices may generate a topological map of the network which may be used to determine the best routes to a destination router or node in the network.

In an example, networking devices may share their route update information with other network devices at periodic time intervals. For instance, in case network devices support OSPF, Link State Advertisements (LSA) may be refreshed after every thirty minutes. In an instance, route update information may be distributed via flooding of route update packets after the designated time interval, in other words, the routing updates may be sent through periodic route update packets. The routing protocol may flood the network with route updates to all neighbor network devices. Each network device 104, 106, 108, 110, 112, and 114 may create route updates and flood the updates to its neighbors.

In an example, one or more of network devices 104, 106, 108, 110, 112, and 114 may each include a determination module, a classification module, time interval module, and a periodic route update module. The term "module" may refer to a software component (machine readable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. A module may reside on a volatile or non-volatile storage medium and configured to interact with a processor of a computing device.

For the sake of simplicity in illustration, only network device 104 is shown to include a determination module 116, a classification module 118, a time interval module 120, and a periodic route update module 122. However, as mentioned above, any or all of the other network devices may include these modules. Some of the example functionalities that may be performed by determination module 116, classification module 118, time interval module 120, and periodic route update module 122 are described in reference to FIG. 2 below.

Figure 2:
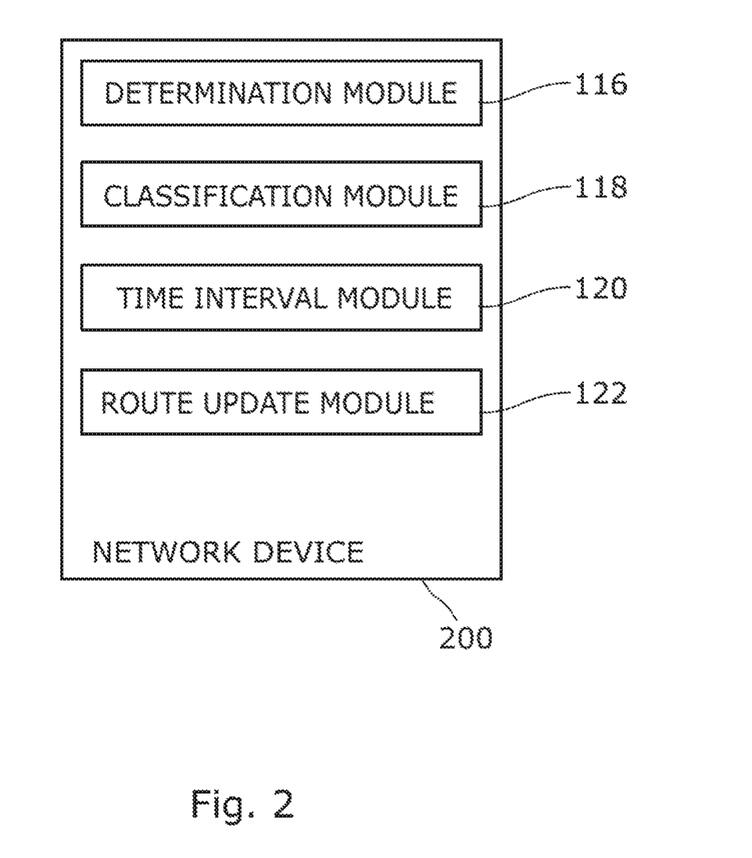
FIG. 2 is a diagram of an example network device for reducing flooding of route updates of a dynamic routing protocol.

FIG. 2 is a block diagram of an example network device 200 for reducing flooding of route updates of a dynamic routing protocol. In an example, network device 200 may be analogous to any of the network devices 104, 106, 108, 110, 112, and 114 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

Network device 200 may include, for instance, a network router, a virtual router, a network switch, a virtual switch, or any network device with routing functionality.

In the example of FIG. 2, network device 200 may include a determination module 116, a classification module 118, a time interval module 120, and a periodic route update module 122.

Determination module 116 may determine number of periodic route update packets received by a router from each of its neighbor routers in a network that uses a dynamic routing protocol (for example, OSPF). In an instance, the determination may occur during adjacency formation. In other words, the determination may take place when a router exchanges routing updates with its neighbor routers.

In an example, a router may identify a "neighbor router", by sending a special packet. For instance, in case of OSPF, a router may identify its neighbors and form adjacencies by sending out hello packets from all OSPF-enabled interfaces. Routers may become neighbors when they possess one or more parameters specified in their respective hello packets. Some example parameters in a hello packet may include router ID of the originating router, area ID of the originating router interface, address mask of the originating interface, router priority, hello interval of the originating interface, and authentication information for the originating interface. When a router receives a hello packet from a neighbor, it may verify one or more parameters such as area ID, network mask, hello interval, authentication, etc. match the values configured on the receiving interface. If the values do not match, the packet may be dropped and no adjacency may be established. On the other hand, if the parameters match, the router ID may be included in a neighbor table of the router.

In an example, determination module 116 may determine number of route update packets received by a router from its neighbor routers after an update interval. For example, in case of OSPF, determination module may determine number of Links State Advertisements (LSAs) received by a router from each of its neighbor routers after 30 minute link state update intervals.

Once determination module 16 determines number of route updates received by a router from its neighbor router, classification module 118 may classify each neighbor router into one of a plurality of groups of neighbor routers in such a manner that number of route updates originating from each group of neighbor routers is approximately same. To provide an example, let's consider a scenario where a router receives 1000, 790, 600, and 380 route updates from four neighbor routers i.e. router A, router B, router C, and router D, respectively. In such case, in an instance, classification module 118 may group these routers into two groups (for example, Group 1 may include routers A and D, and Group 2 may include routers B and C) so that number of route updates originating from each group of neighbor routers is same or nearly equal.

Time interval module 120 may determine a first route update interval for each group of neighbor routers for sending a respective first set of future route updates therefrom to the router. A route update interval defines the periodic time interval when a router may share route updates with its neighbor routers. A route update interval may be predefined for a dynamic routing protocol. For example, in OSPF, the periodic route update interval is 30 minutes. In other words, after every 30 minutes a router may share link state updates with neighbor routers.

Once classification module 118 classifies each neighbor router of a router into one of a plurality of groups of neighbor routers, time interval module 120 may determine a first route update interval for each group of neighbor routers. In an instance, a first route update interval for a group of neighbor routers may be different from the existing or default periodic route update interval of the dynamic routing protocol (for example, 30 minutes in OSPF) that may be used in the network. A separate first route update interval may be determined for each group of neighbor routers. A first route update interval may be used by a group of neighbor routers for sending a first set of future route updates to the router. Likewise, each group of neighbor routers may send a respective first set of future route updates to the router.

In an example, a first route update interval for a group of neighbor routers may be determined as follows. Total number of packets (say 'N') received by a router from its neighbor routers, during a route update, may be calculated. Total number of packets that the router may process during a timeframe without dropping a packet (say 'p') may also be calculated. Using these values, number of intervals "n" for distributing the existing or default periodic route update interval among groups of neighbor routers may be determined as n=N/p, where 'n' may be rounded off to its nearest integer value. In an instance, in the case of OSPF, route update interval of 30 minutes (or 1800 seconds) may be divided by 'n' to determine intervals into which groups of neighbor routers may be distributed based on number of packets generated by each of the groups of neighbor routers. If all neighbor routers belong to the same category, the number of neighbor routers may be equally distributed into these intervals.

To provide an example illustration in the context of FIG. 1, let's assume that all five neighbor routers of router, flood 500 packets each to the router during a route update interval. Thus, N=5*500=2500. If 'p' is assumed to be 1000, for example, based on the capabilities of the router, the number of intervals for distributing groups of neighbor routers may be calculated as follows: n=N/p=2500/1000=2.5=~3. It indicates that the route update interval of 1800 seconds (in case of OSPF) may be divided into three equal intervals for receiving route updates from groups of neighbor routers. Thus, for instance, a group of neighbor routers (say, 206 and 208) may be notified to push periodic route update interval by 600 seconds. Likewise, another group of routers (say, 210 and 212) may be notified to push periodic route update interval by 1200 seconds.

In an example, further to determining a first route update interval for each group of neighbor routers, time interval module 120 may determine a subsequent route update interval for each group of neighbor routers. A subsequent route update interval for each group of neighbor routers may be used for sending a respective subsequent set of future route updates from member routers of each group of neighbor routers to the router. In other words, each group of neighbor routers may use a respective first route update interval for sending only a respective first set of future route updates to the router. A subsequent set of future router updates (i.e. further to the first set of future router updates) may be sent by each group of neighbor routers based on respective subsequent route update interval determined for each group of neighbor routers. In an example, a subsequent route update interval for a group of neighbor routers may be determined by including an existing or default route update interval for the group of neighbor routers with first route interval for the group. To provide an illustration, if the existing route update interval for a group of neighbor routers is 30 minutes (such as in OSPF) and the first route update interval for the group is 10 minutes, the subsequent route update interval for the group may be determined as 40 minutes (i.e. 30 minutes+10 minutes=40 minutes). In an example, further succeeding route update intervals (i.e. route interval further to the subsequent route update interval) for a group of neighbor routers may be determined by including an existing or default route update interval for the group of neighbor routers with preceding route interval for the group. To provide an illustration, if the existing route update interval for a group of neighbor routers is 30 minutes (such as in OSPF) and the preceding route update interval for the group is 40 minutes, the succeeding route update interval for the group may be determined as 70 minutes (i.e. 40 minutes+ 30 minutes=70 minutes). The same process may be followed for determining future successive route update intervals for each group of neighbor routers.

In an instance, route update module 122 may notify the respective first route update interval for sending the respective first set of future route updates to respective member routers of each group of neighbor routers. In other words route update module 122 may notify the first route update interval determined for a group of neighbor routers to each member router in the group. In like manner, each neighbor router is notified of the time when it may push the first set of future route updates to the router. In an instance, route update module 122 may notify the first route update time to a neighbor router by unicasting a packet to the neighbor router indicating the time delta by which the next periodic route update may be pushed. For example, in case of OSPF, route update packet of type "0x200F" may be used to send the time delta information to the neighbor router. The neighbor router, on receiving this packet, may send an acknowledgement back to the router indicating its consent to push the next periodic route update by the requested time. In an instance, this may be done by sending a route update acknowledgement packet of type "0x200F". On receiving the acknowledgement, the router may act as if it has received a periodic route update from the neighbor router for all the routes advertised by the neighbor router. If an acknowledgement is not received from a neighbor, the packet may resend for a pre-defined times.

In an instance, a router may receive a respective first set of future route updates from member routers of each group of neighbor routers upon expiration of the respective first route update interval determined for each group of neighbor routers. In a further instance, a router may receive a respective subsequent set of future route updates from member routers of each group of neighbor routers upon expiration of the respective subsequent route update interval determined for each group of neighbor routers. In a yet further example, a router may receive a respective successive set of future route updates from member routers of each group of neighbor routers upon expiration of the respective successive route update interval determined for each group of neighbor routers.

Figure 3:
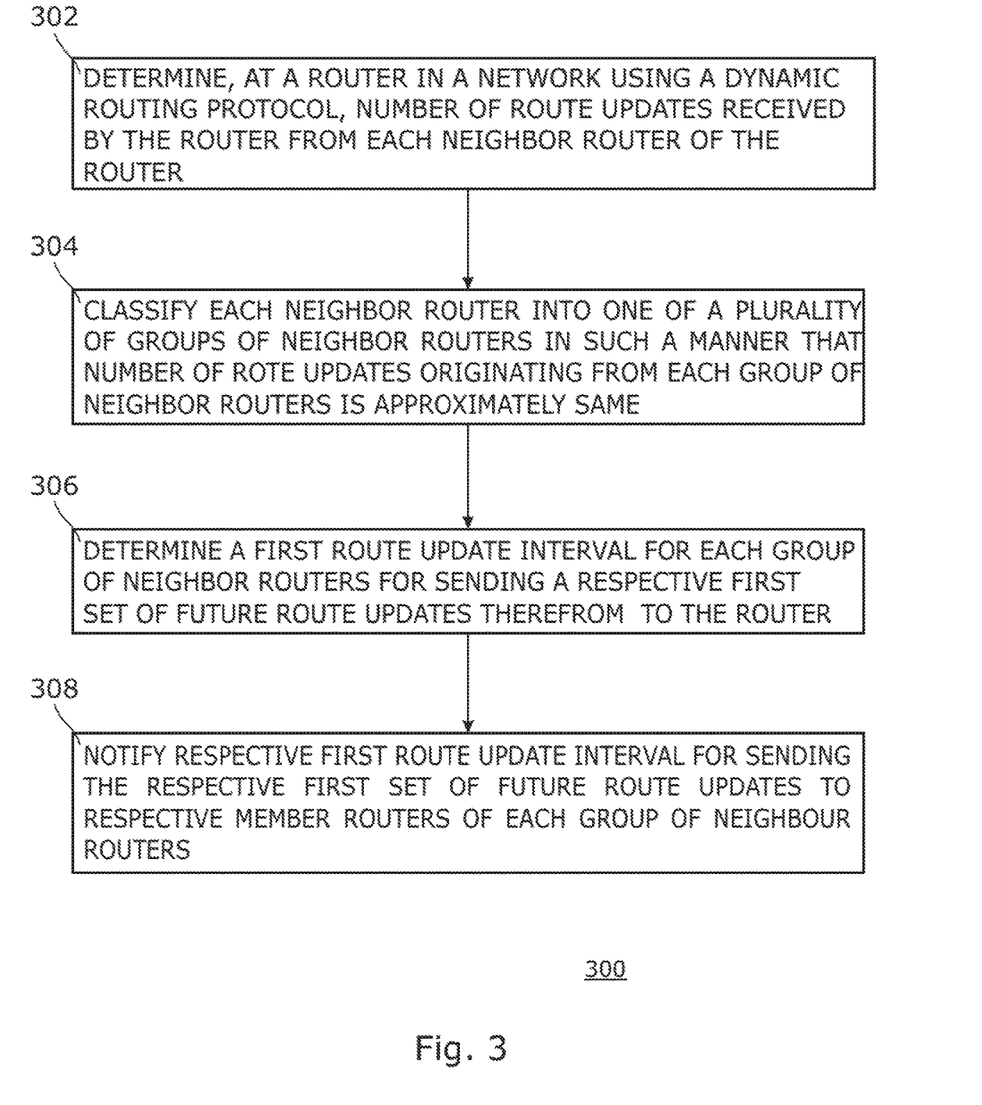
FIG. 3 is a block diagram of an example method for reducing flooding of route updates of a dynamic routing protocol.

FIG. 3 is a block diagram of an example method 300 for reducing flooding of route updates of a dynamic routing protocol. The method 300, which is described below, may be partially executed on a computing device such as network devices 104, 106, 108, 110, 112, and 114 of FIG. 1 or network device 200 of FIG. 2. However, other suitable computing devices may execute method 300 as well. At block 302, number of route updates received by a router from each neighbor router may be determined, wherein the router may be present in a network using a dynamic routing protocol. At block 304, each neighbor router may be classified into one of a plurality of groups of neighbor routers in such a manner that number of route updates originating from each group of neighbor routers is approximately same. At block 306, a first route update interval may be determined for each group of neighbor routers for sending a respective first set of future route updates therefrom to the router. At block 308, respective first route update interval for sending the respective first set of future route updates may be notified to the respective member routers of each group of neighbor routers.

Figure 4:
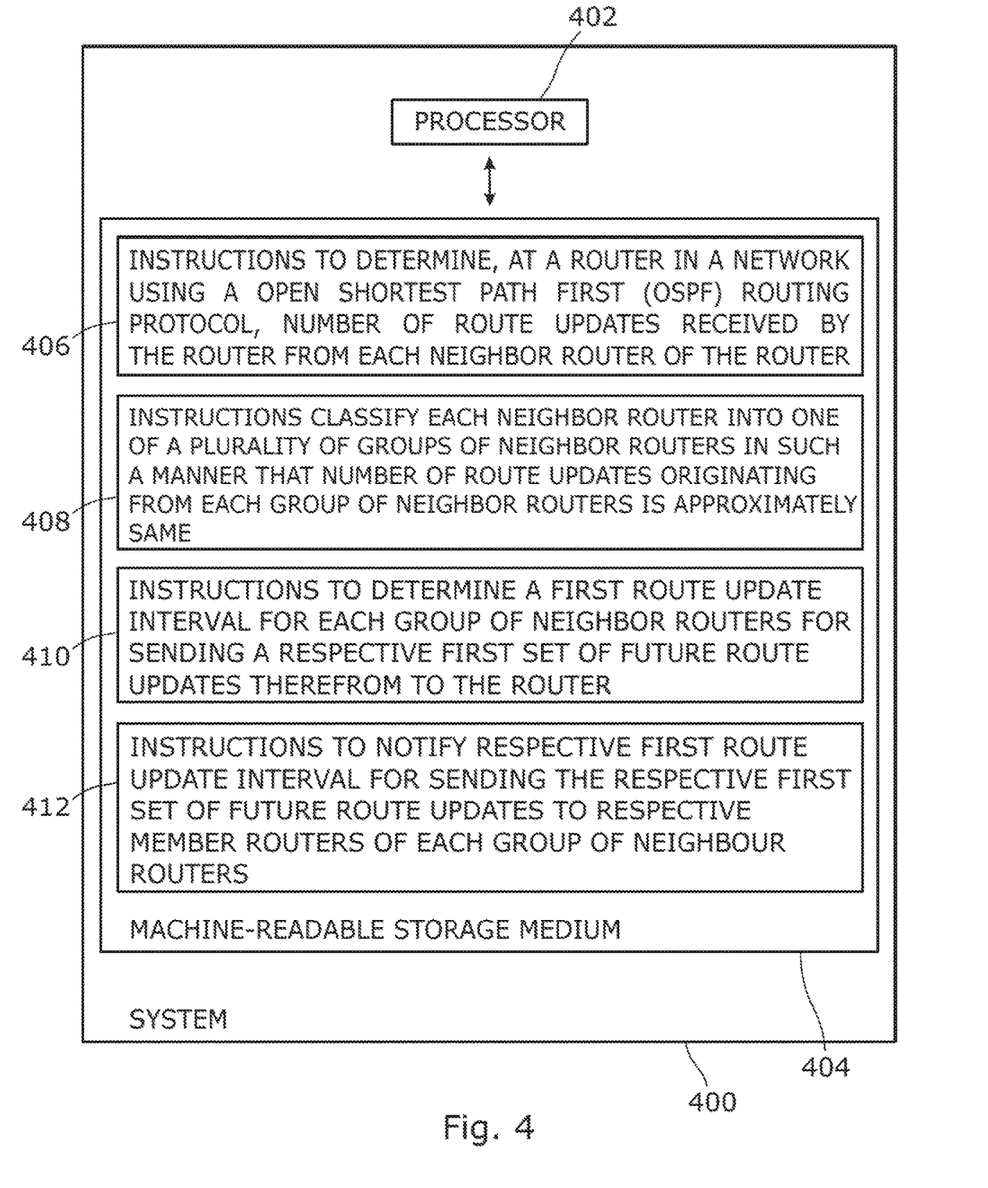
FIG. 4 is a block diagram of an example system for reducing flooding of route updates of a dynamic routing protocol.

FIG. 4 is a block diagram of an example system 400 for reducing flooding of route updates of a dynamic routing protocol. System 400 includes a processor 402 and a machine-readable storage medium 404 communicatively coupled through a system bus. In an example, system 400 may be analogous to network devices 104, 106, 108, 110, 112, and 114 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, and 412. In an example, instructions 406 may be executed by processor 402 to determine, at a router in a network using Open Shortest Path First (OSPF) routing protocol, number of route updates received by the router from each neighbor router of the router. Instructions 408 may be executed by processor 402 to classify each neighbor router into one of a plurality of groups of neighbor routers in such a manner that number of route updates originating from each group of neighbor routers is approximately same. Instructions 410 may be executed by processor 402 to determine a first route update interval for each group of neighbor routers for sending a respective first set of future route updates therefrom to the router. Instructions 412 may be executed by processor 402 to notify respective first route update interval for sending the respective first set of future route updates to respective member routers of each group of neighbor routers.

For the purpose of explanation, the example method of FIG. 3 is shown as executing serially, however it is to be understood and appreciated that the present and other examples are not limited by the illustrated order. The example systems of FIGS. 1, 2 and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method for reducing flooding of route updates of a dynamic routing protocol, comprising:
    determining, at a router in a network using the dynamic routing protocol, a number of route updates received by the router from each neighbor router of the router;
    classifying each neighbor router into one of a plurality of groups of neighbor routers in such a manner that the number of route updates originating from each group of neighbor routers is approximately same;
    determining a first route update interval for each group of neighbor routers for sending a respective first set of future route updates therefrom to the router; and
    notifying the respective first route update interval for sending the respective first set of future route updates to respective member routers of each group of neighbor routers.

2. The method of claim 1, further comprising receiving, at the router, the respective first set of future route updates from the member routers of each group of neighbor routers upon expiration of the respective first route update interval determined for each group of neighbor routers.

3. The method of claim 1, further comprising receiving an acknowledgment from a member router receiving the notification of the respective first route update interval.

4. The method of claim 3, wherein the acknowledgment includes an acceptance by the member router to send the respective first set of future route updates to the router upon expiration of the respective first route update interval notified to the member router.

5. The method of claim 1, further comprising determining a subsequent route update interval for each group of neighbor routers for sending a respective subsequent set of future route updates therefrom to the router by including the existing route update interval to a respective first route interval for each group of neighbor routers.

6. The method of claim 5, further comprising receiving, at the router, the respective subsequent set of future route updates from the member routers of each group of neighbor routers upon expiration of the respective subsequent route update interval determined for each group of neighbor routers.

7. A network device for reducing flooding of route updates of a dynamic routing protocol, comprising:
    a determination module to determine a number of route update packets received from each neighbor network device in a network using the dynamic routing protocol;
    a classification module to classify each neighbor network device into one of a plurality of groups of neighbor network devices in such a manner that the number of route updates originating from each group of neighbor network devices is approximately same;
    a time interval module to determine a first route update interval for each group of neighbor network devices to send a respective first set of future node updates therefrom to the network device; and
    a route update module to notify the respective first route update interval to send the respective first set of future route updates to respective member network devices of each group of neighbor network devices.

8. The network device of claim 7, wherein the time interval module to determine the first route update interval for each group of neighbor network devices by dividing default route update interval in the dynamic routing protocol into equal intervals and assigning each interval to a respective group of neighbor network devices for receiving route updates therefrom.

9. The network device of claim 7, wherein the dynamic routing protocol is Open Shortest Path First (OSPF) routing protocol.

10. The network device of claim 7, wherein the determination module to determine a number of route update packets received from each neighbor network device during adjacency formation.

11. A non-transitory machine-readable storage medium comprising instructions for reducing flooding of route updates of a dynamic routing protocol, the instructions executable by a processor to:
    determine, at a router in a network using an Open Shortest Path First (OSPF) routing protocol, a number of route updates received by the router from each neighbor router of the router;
    classify each neighbor router into one of a plurality of groups of neighbor routers in such a manner that the number of route updates originating from each group of neighbor routers is approximately same;
    determine a first route update interval for each group of neighbor routers to send a respective first set of future route updates therefrom to the router; and
    notify the respective first route update interval to send the respective first set of future route updates to respective member routers of each group of neighbor routers.

12. The storage medium of claim 11, wherein the router is a core router in the network.

13. The storage medium of claim 11, further comprising instructions to apply the respective first set of future route updates received from each group of neighbor routers to the router.

14. The storage medium of claim 11, wherein the network is an autonomous system.

15. The storage medium of claim 11, wherein the network is an IP network.

* * * * *